July 27, 1965

E. S. GILCHRIST 3,197,780

INTRINSIC SAFETY PROCESS CONTROL SYSTEM

Filed Sept. 18, 1961

INVENTOR.
EDGAR S. GILCHRIST
BY Mason, Kolehmainen,
Rathburn and Wyss
ATTORNEYS

July 27, 1965     E. S. GILCHRIST     3,197,780
INTRINSIC SAFETY PROCESS CONTROL SYSTEM
Filed Sept. 18, 1961     4 Sheets-Sheet 2

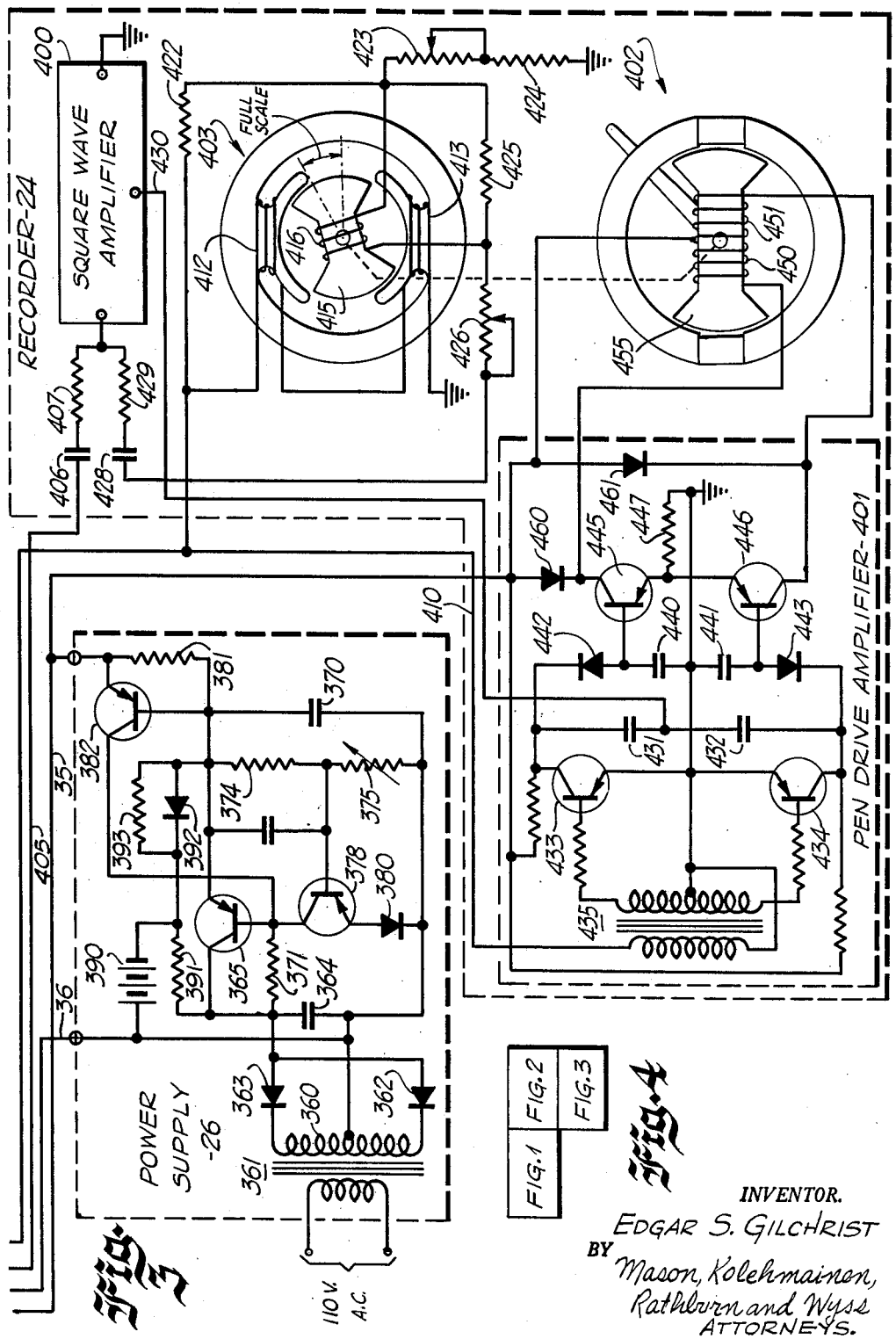

July 27, 1965  E. S. GILCHRIST  3,197,780
INTRINSIC SAFETY PROCESS CONTROL SYSTEM
Filed Sept. 18, 1961  4 Sheets-Sheet 4
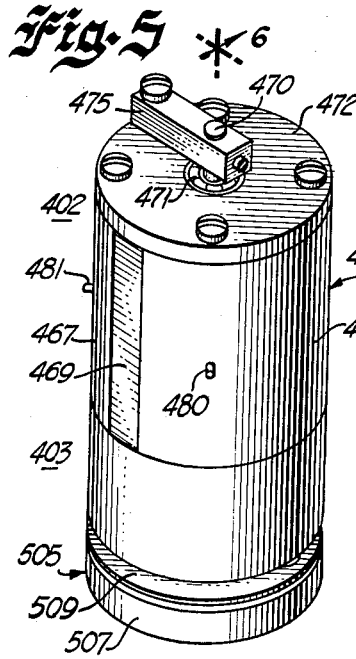
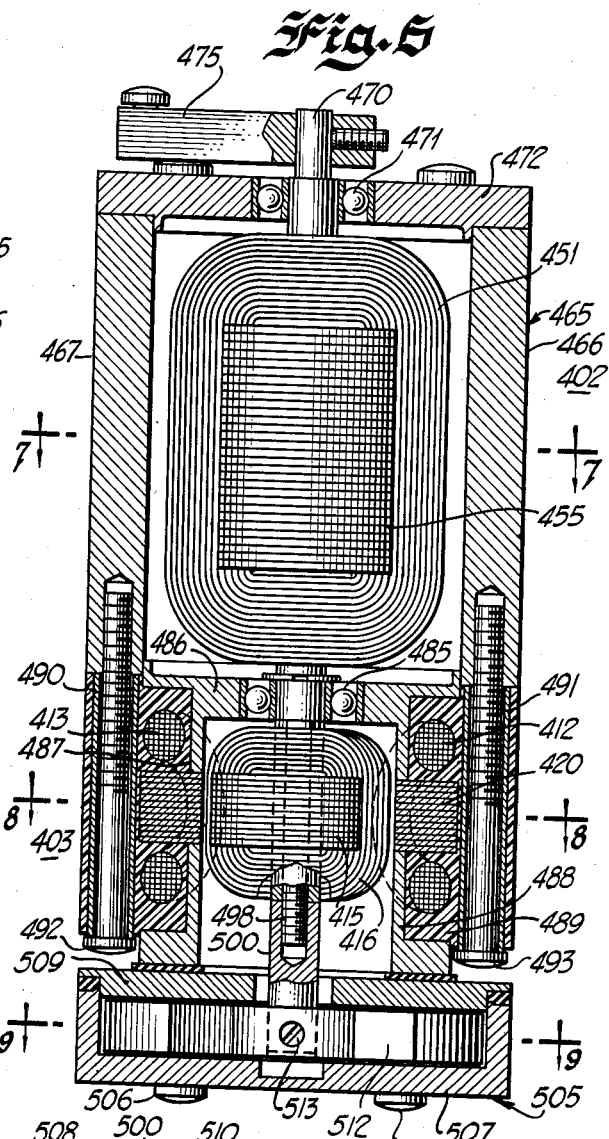
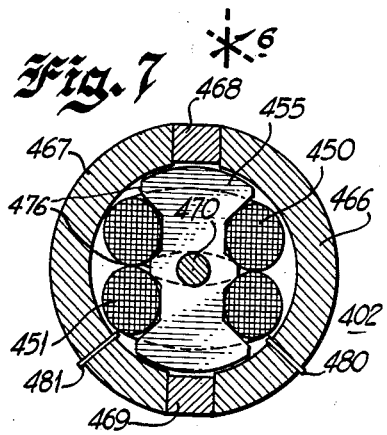
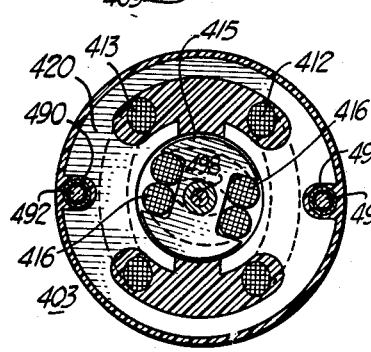
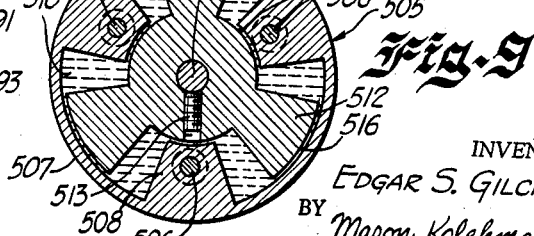
INVENTOR.
EDGAR S. GILCHRIST
BY Mason, Kolehmainen, Rathburn and Wyss
ATTORNEYS.

3,197,780
INTRINSIC SAFETY PROCESS CONTROL SYSTEM

Edgar S. Gilchrist, Fairfield, Conn., assignor, by mesne assignments, to Consolidated Electrodynamics Corporation, Pasadena, Calif., a corporation of California
Filed Sept. 18, 1961, Ser. No. 138,779
12 Claims. (Cl. 346—32)

The present invention relates to process control systems of the type wherein one or more process variables are continuously controlled in accordance with an electronic signal, and the invention has for an object thereof the provision of such a process control system which is intrinsically safe in atmospheres susceptible to explosions and may be serviced while the circuits thereof are functioning in their normal manner to control the process.

In certain instances it is desirable to examine the performance of a process control system or perform certain servicing operations on this system without interrupting the continuity of the process or disturbing the operation thereof. However in an electronic process control system in which electrical signals are employed there is always the danger of ignition or explosion, particularly in the combustible atmospheres in which many processes are carried out. For example, explosions can be caused where the energy dissipated in an electrical arc is sufficient to cause combustion in a given gas, such as methane. Such ignition can be caused by the discharge of a capacitor, the interruption of a circuit including inductive reactance, or hot wires in circuits which do not have either inductance or capacity but in which a sufficient current flows in a fine wire to produce such heating. In addition, both the voltage and current requirements of the electronic process control system must be sufficiently low that there is no danger to personnel servicing the equipment when touching the exposed contacts of the system during servicing operation.

It is, therefore, a further object of the present invention to provide an electronic process control system in which the maximum current which may be produced in the system even under short circuits is limited to a value such that electrical ignition in combustible atmospheres is positively prevented.

It is still a further object of the present invention to provide an electronic process control system which is intrinsically safe and may be serviced while operating in a normal manner even in combustible atmospheres.

In an electronic process control system it is in many instances important to provide a control system which is highly sensitive to changes in the process variable being measured. However, such a high sensitivity system in inherently susceptible to extraneous noise voltages and pickup which would cause false signals in the output of the process control system and inaccurate control of the process. Furthermore, since the electronic process control system must be energized from supply lines which in most instances are the conventional 110 volt supply lines in the factory in which the process is carried out, provision must be made for counteracting the effects of undesired fluctuations in the power supply line voltage so that control of the process will not be affected thereby.

It is, accordingly, a further object of the present invention to provide a new and improved electronic process control system in which the electrical signal representing the measured variable and the electrical signal representing the desired control or set point of the process are electrically balanced with respect to each other so that power supply fluctuations and transients produced in the power lines do not affect these signals and hence do not appear in the output of the controller portion of the system.

It is a still further object of the present invention to provide a new and improved electronic process control system in which the electrical transmitter signal and the electrical set point signal are balanced for power supply fluctuations while at the same time providing an arrangement whereby an electrical output signal from a preceding process control loop may be cascaded with the electrical set point signal.

It is another object of the present invention to provide a new and improved electronic process control system in which a strain gauge type of measuring element may be employed in the process measurement area while providing a balanced electrical circuit arrangement between the strain gauge output signal and an electrical set point signal so that these signals do not produce undesired error signal fluctuations.

It is another object of the present invention to provide a new and improved electronic process control system wherein the current requirements of the measuring element, recorder and controller portions of the system are all sufficiently small that the entire system may be operated by a standby battery of relatively small dimensions for a reasonable period of time in the event the main power supply which normally supplies power to the system fails.

It is a further object of the present invention to provide a new and improved electronic process control system wherein an improved arrangement is provided for charging a standby battery arrangement during periods when the system is energized from the conventional power lines so that this standby battery may be employed in the event the main power line voltage fails.

It is another object of the present invention to provide a new and improved recorder suitable for use in an electronic process control system which is of extremely low current requirements so that the recorder may be employed in an intrinsically safe process control system in which the total current is limited to a value such that explosions will not be produced by hot wires and electrical arcs when operating in combustible atmospheres.

It is still a further object of the present invention to provide a new and improved recorder for an electronic process control system which is arranged to respond to a square wave type of input signal and to position a recording pen in accordance therewith and wherein a square wave type of feedback signal is employed which is proportional to pen deflection for accurate positioning thereof.

It is another object of the present invention to provide a new and improved recorder suitable for use in an electronic process control system wherein the current required to position the recording pen at any particular point within the range of the recorder is extremely small.

It is still another object of the present invention to provide a new and improved instrumentation amplifier suitable for amplifying a direct current signal derived from a low level measuring element wherein there is provided an improved ararngement for converting the D.C. input signal to a suitable square wave type signal.

It is a further object of the present invention to provide a new and improved instrumentation amplifier wherein an improved arrangement is provided for converting a direct current output signal to a corresponding square wave output signal.

It is a still further object of the present invention to provide a new and improved instrumentation amplifier which is suitable for measuring the low level direct current signal from a measuring instrument such as a thermocouple or strain gauge and wherein the span and offset requirements of the amplifier may be inductively calibrated while, at the same time, providing an arrangement which is substantially free from switching transients.

Briefly, in accordance with one aspect of the invention, the electronic process control system of the invention comprises a measuring element preferably in the form of a strain gauge, which is energized from the control station in series with a circuit for deriving an electrical set point signal. The output of the measuring element is amplified in an instrumentation amplifier of low current requirements to provide a direct current output signal at relatively high level which is then compared with the electrical set point signal at the control station. In addition, the instrumentation amplifier provides a square wave output signal which is supplied to a recorder portion of the system, this recorder also having low current requirements, particularly when the recorder pan is not moving. The error signal derived by comparison between the instrumentation amplifier direct current output signal and the electrical set point signal is supplied to a controller which also has low current consumption so that a standardized direct current output signal is derived from the controller with a minimum of power expended in this component of the system.

A regulated direct current power supply is employed to energize all of the above described units of the process control system and facilities are provided in this power supply for limiting the current which may be drawn by any particular unit even under short circuit requirements to a value such that the process control system is intrinsically safe in explosive atmospheres and also may be serviced while the process control system is in operation. Furthermore, all of the above described components of the process control system are energized with a maximum voltage of less than 20 volts so that the process control system is intrinsically safe from the standpoint of voltage discharges across capacitors and the like. In addition, the individual components of the process control system are preferably encapsulated so that a minimum number of circuit points are accessible during the servicing operations so as to further minimize hazards due to arcing, and the like. Such encapsulation also has the advantage of minimizing the number of locations where an accidental short circuit can bridge a current or voltage limiting element.

With the above described process control system, a sufficiently low current drain is provided for all of the components of the system so that a small standby battery may be employed in the event that the main power supply fails and this standby battery may be of reasonable size and weight while providing suitable operation of the system for a period up to approximately one hour of failure of the main power supply. In addition, an arrangement is provided for charging this standby battery during normal operation of the system so that it always remains fully charged and is ready to be automatically inserted into the circuit in the event of the failure of the main power supply.

The invention, both as to its organization and method of operation, together with further objects and advantages thereof, will best be understood by reference to the following specification taken in connection with the accompanying drawings, in which:

FIGS. 1, 2 and 3 when arranged in the manner shown in FIG. 4 comprise a schematic diagram of the electrical circuit components of an electronic process control system embodying the principles of the present invention;

FIG. 5 is a perspective view of a combined pen motor and position translating unit used in the recorder portion of the system of FIGS. 1 to 3, inclusive;

FIG. 6 is a sectional view taken along the rotational axis of the unit of FIG. 5;

FIG. 7 is a sectional view taken along the lines 7—7 of FIG. 6;

FIG. 8 is a sectional view taken along the lines 8—8 of FIG. 6; and

FIG. 9 is a sectional view taken along the line 9—9 of FIG. 6.

Figure 1:
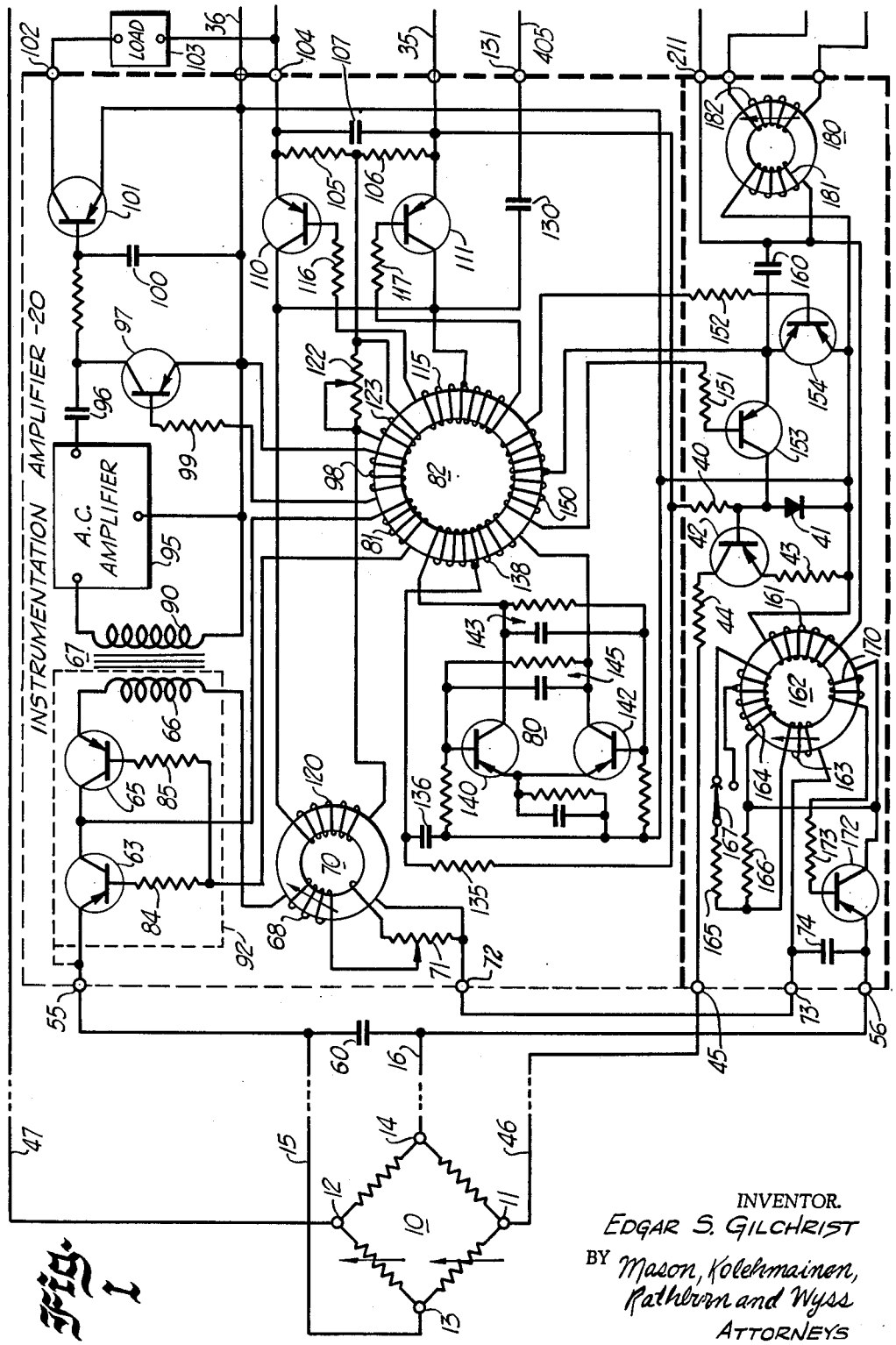
Figure 2:
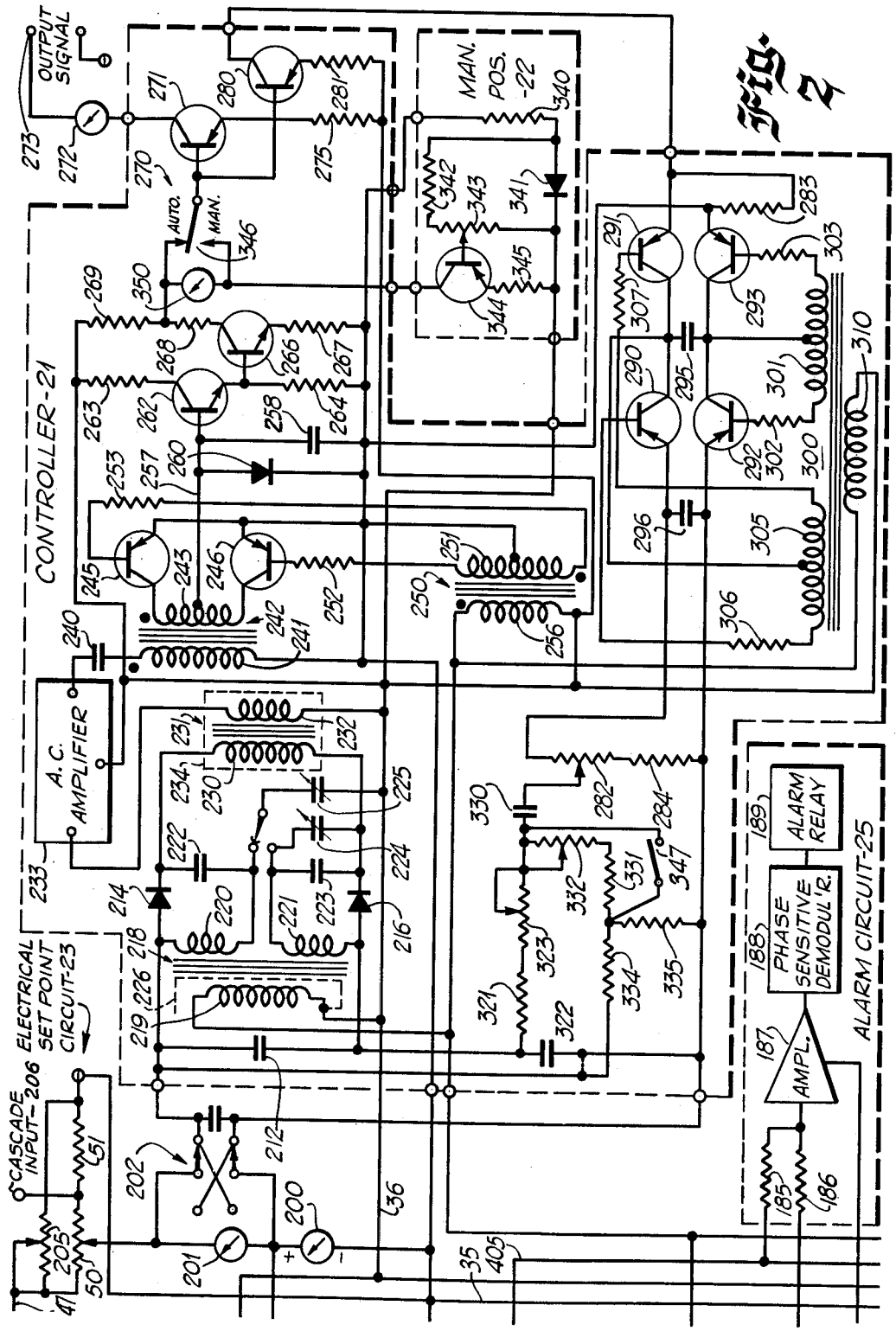

Referring now to the drawings, the electronic process control system of the present invention is therein illustrated as comprising a measuring element in the form of a strain gauge bridge circuit indicated generally at 10, the measuring element 10 being located in the process area. The strain gauge bridge circuit 10 is provided with a pair of energizing terminals 11 and 12 to which an energizing current is supplied from the central control station and is provided with a pair of output terminals 13 and 14 across which appears an output signal which is transmitted by way of the conductors 15 and 16 from the process area to the control station. At the control station an instrumentation amplifier indicated generally at 20, a controller indicated generally at 21, a manual control positioner indicated generally at 22, an electrical set point circuit 23, a recorder indicated in block form at 24, an alarm circuit indicated generally at 25 and a power supply circuit 26 are provided.

The power supply 26 is arranged to provide a D.C. potential on the output conductor 35 thereof which is negative with respect to the potential on the output conductor 36 thereof by a voltage of $-19.6$ volts and this supply potential is connected to the various components of the electronic process control system of the invention.

In order to energize the strain gauge bridge circuit measuring element 10 there is provided a currrent regulating arrangement which is energized from the power supply output conductors 35, 36 of the power supply 26. More particularly, a resistor 40 in the amplifier 20 is connected in series with a Zener diode 41 between the negative supply conductor 35 and the positive supply conductor 36 so that a regulated potential of $-5.6$ volts is produced across the diode 41. This regulated reference voltage is supplied to the base electrode of a current regulating transistor 42 the emitter of which is connected through a resistor 43 to the positive supply and common conductor 36. The collector of the transistor 42 is connected through a current limiting resistor 44 to the excitation output terminal 45 of the amplifier 20, the terminal 45 being connected by way of one of the energizing conductors 46 to the energizing terminal 11 of the measuring element 10 which is located in the process area. The other energizing terminal 12 of the measuring element 10 is connected by way of an energizing conductor 47 back to the control station and specifically to a set point potentiometer 50 in the electrical set point circuit 23 which is located at the control station. The potentiometer 50 is connected through a cascade control resistor 51 to the negative supply conductor 35. It will thus be seen that the current regulating transistor 42 is arranged to supply current to both the measuring element 10 and the electrical set point potentiometer 50 in series and the value of the regulated current supplied by this transistor is set by the value of the resistor 43 in the emitter circuit of this transistor. Preferably, the series current flowing through the measuring element 10 and the set point potentiometer 50 has a value of approximately 30 milliamperes so that proper operation of these process control components is provided as will be described in more detail hereinafter.

The variable elements in the bridge circuit of the measuring unit 10 are arranged to be varied in accordance with variations in a measured process variable, as will be readily understood by those skilled in the art. For example, the strain gauge measuring unit 10 may respond to any process variable such as temperature, pressure, liquid level, moisture, etc. The strain gauge measuring element 10 is arranged to provide a low level direct current signal at the output terminals 13 and 14 thereof which is transmitted by way of the signal conductors 15 and 16 to the control station and specifically to the input terminals 55 and 56 of the instrumentation amplifier 20. The instrumentation amplifier 20 is in general similar to the amplifier arrangement described and claimed in a copending application of Edgar S. Gilchrist, Serial No. 75,461, filed December 9, 1960, which is assigned to the same assignee as the present invention. However, the instrumentation amplifier 20 of the present invention includes certain features which are of particular significance in the process control system of the present invention and hence will be described in detail. However, it will be understood that insofar as the broad principles of the process control system of the present invention are concerned the instrumentation amplifier disclosed in the above identified copending application Serial No. 75,461 may be employed.

In the instrumentation amplifier 20 the direct current signal from measuring element 10 is first converted into a square wave signal which is then amplified to a suitable voltage level and is then rectified to provide a direct current or a D.C. voltage output signal of a predetermined range of values corresponding to a particular desired span of the instrument. The D.C. voltage output signal is then translated into a square wave signal of corresponding peak-to-peak amplitude which is employed as a feedback signal. This feedback signal may be varied in amplitude to adjust the span of the instrument to a predetermined range of values. However, to provide for zero offset and cold junction compensation a reference square wave of constant amplitude is employed to derive a square wave signal of the correct magnitude and this square wave signal is then rectified to provide a D.C. feedback signal corresponding to the desired zero offset and cold junction compensation. The D.C. feedback signal is then added to the square wave feedback signal and a combination of these two signals is applied back to the input circuit of the amplifier for comparison purposes with the direct current input signal derived from the measuring unit. The result of this comparison is represented by a square wave error signal. Preferably a large capacitor 60 is connected across the signal conductors 15 and 16 at the control station so as to remove all extraneous alternating current signals which might be picked up in transmission of the output signal of the measuring unit from the process area.

In order to produce a square wave error signal which is proportional to the difference between the direct current signal derived from the measuring unit and the above described combined D.C. and square wave feedback signals, there is provided a pair of switching transistors 63 and 65 which are connected in series from the amplifier input terminal 55 to one side of a primary winding 66 of a coupling transformer 67. The other end of the primary winding 66 is connected through a variable turn winding 68 on the inductive calibration span transformer indicated generally at 70, a fine span adjustment potentiometer 71 and back to the other amplifier input terminal 56 through a circuit which includes the terminals 72 and 73 of the instrumentation amplifier 20 and the D.C. feedback voltage produced across a capacitor 74 which is connected between the amplifier terminals 73 and 56 and provides a direct current feedback signal for zero offset and cold junction compensation purposes, as will be described in more detail hereinafter. The switching transistors 63 and 65 are turned on and off in synchronism by means of a square wave signal which is developed in the instrumentation amplifier 20 by means of a square wave signal generator indicated generally at 80 and more particularly across one of the windings 81 of an output transformer indicated generally at 82 of the square wave signal generator 80. To this end, one end of the winding 81 is connected to the collector electrode of each of the switching transistors 63 and 65 and the other end of this winding is connected through the resistor 84 to the base of the transistor 63 and through the resistor 85 to the base of the transistor 65. The transistors 63 and 65 are thus both rendered fully conductive simultaneously during the negative going portions of the square wave appearing across the winding 81, it being noted that the transistors 63 and 65 are operated in the inverted form in which the switching waveform is applied between the collector and base electrodes of the transistor so that an extremely low impedance path is provided between the emitter and collector of each transistor. Accordingly, the primary winding 66 of the coupling transformer 67 is connected in circuit with the D.C. signal developed by the measuring unit 10 and the above described feedback and zero offset signals during the periods when the transistors 63 and 65 are fully conductive so that a square wave error signal is produced in the secondary winding 90 of the transformer 67 equal to the difference between the D.C. input signal developed by the measuring unit 10 and the feedback and zero offset signals. For a more detailed explanation of the manner in which the D.C. input signal is balanced against a square wave feedback signal reference may be had to the above identified copending application.

It will be noted that the transistors 63 and 65 are oppositely polarized in the above described circuit path. When these transistors are rendered fully conductive in the manner described above, there is still produced between the emitter and collector of the fully conductive transistor a small voltage drop. However, since the two transistors 63 and 65 are oppositely polarized, the voltage drops produced by each transistor are opposed to each other and hence cancel insofar as the primary winding 66 of the coupling transformer 67 is concerned. Accordingly, variations in the conductive voltage drops of the transistors 63 and 65 do not produce errors in the comparison circuit of the instrumentation amplifier 20. It should also be noted that when the transistors 63 and 65 are not rendered conductive there will still be leakage currents flowing through these transistors, as will be readily understood by those skilled in the art. However, due to the above described configuration in which the transistors are oppositely polarized the leakage currents contributed by each transistor tend to cancel and hence do not cause extraneous current flow through the coupling transformer primary winding 66.

In order to prevent the input stage of the instrumentation amplifier 20 from responding to undesired voltage pickup which may be produced commonly on the conductors 15 and 16 with respect to ground, the transistors 63 and 65 and the primary winding 66 of the transformer 67 are preferably enclosed in an electrostatic shield indicated in dotted lines at 92 in FIG. 1 and the shield 92 is connected to the amplifier input terminal 55. Accordingly, if any extraneous noise voltages or pickup voltage is produced between either of the terminals 55 and 56 and ground these stray currents will flow to ground through the electrostatic shield 92 and hence will not flow through the switching transistors 63 and 65 and the transformer winding 66. In addition, the electrostatic shield 92 may also be arranged to provide magnetic shielding so as to reduce pickup from outside sources to the input stage of the instrumentation amplifier 20.

The square wave error signal which is produced across the secondary winding of the coupling transformer 67 is applied to an A.C. amplifier 95 which comprises a series of three transistor stages providing suitable amplification of the square wave signal applied to the input of the amplifier 95. For example, a square wave amplifier such as shown and described in the above identified copending application may be employed as the amplifier 95 in the present invention, it being understood that the common terminal in the instrumentation amplifier 20 is shown as the plus terminal of the power supply 26 rather than a ground symbol as in the copending application referred to heretofore.

The output square wave signal from the amplifier 95 is coupled through a condenser 96 to a demodulation transistor 97 the conduction periods of which are controlled in accordance with a square wave signal developed across another winding 98 of the output transformer 82, the winding 98 being connected through a resistor 99 to the base of the transistor 97 and the emitter of this transistor being connected to the common positive conductor 36 from the power supply. Since the square wave error signal is derived from the switching transistors 63 and 65 which are controlled by the square waves developed across the winding 81 and the demodulation transistor 97 is controlled by means of the square wave produced across the winding 98, the two square wave signals are in synchronism and accordingly there is developed across the condenser 100 a D.C. voltage which is proportional in amplitude to the amplified error signal developed in the output of the amplifier 95 when said output is of the proper phase. Otherwise it is zero. This D.C. signal appearing across the condenser 100 is amplified in a D.C. amplifier transistor 101, the emitter of the transistor 101 being connected to the positive power supply output terminal 36 and the collector of this transistor being connected to an output terminal 102 of the instrumentation amplifier 20.

If the load circuit for the instrumentation amplifier 20 requires a current signal, this load, such as the indicated load circuit 103, is connected between the terminal 102 and a terminal 104 of the instrumentation amplifier 20, the terminal 104 being connected through a pair of resistors 105 and 106 to the minus supply conductor 35. The resistors 105 and 106 are arranged so that with a current variation of 1 to 5 milliamperes to the load circuit 103 a voltage variation between the terminal 104 and the conductor 35 of from 0.4 to 2.0 volts will be produced. If a D.C. current output signal is not required then the load 103 is eliminated and the terminals 102 and 104 merely connected together so that this unidirectional voltage is produced between the terminal 104 and the conductor 35. This unidirectional voltage, is in the illustrated embodiment, employed as the output signal of the instrumentation amplifier 20 and will vary in accordance with variations in the process variable as measured by the measuring unit 10. A filter condenser 107 is connected across the resistors 105 and 106 so as to filter out any square wave component which may be present in the collector circuit of the transistor 101 so that a truly unidirectional output signal is provided for the instrumentation amplifier 20.

In order to provide a square wave type of feedback signal, a switching arrangement is employed which includes the transistors 110 and 111, the collectors of these two transistors being connected together and the emitters thereof being connected respectively to the terminal 104 and the negative supply conductor 35. The transistors 110 and 111 are alternately rendered conductive by means of a square wave switching signal which is applied to the base electrodes of these transistors through a center tapped winding 115 of the square wave generating output transformer 82. More particularly, the center tap of the winding 115 is connected to the collectors of the transistors 110 and 111, the upper end of this winding is connected through a resistor 116 to the base electrode of the transistor 110 and the bottom end of the winding 115 is connected through a resistor 117 to the base electrode is of the transistor 111. Accordingly, the transistors 110 and 111 are alternately rendered conductive so that the potentials appearing across the resistors 105 and 106 are alternately impressed upon the primary winding 120 of the span transformer 70. More particularly, when the transistor 110 is rendered fully conductive, the voltage appearing across the resistor 105 is impressed upon the winding 120 in series with a small square wave signal which is produced across a potentiometer 122 connected between the junction point of the resistors 105 and 106 and the bottom end of the winding 120. The potentiometer 122 is connected to a winding 123 of the output transformer 82, the winding 123 having a small number of turns so that a relatively small amplitude square wave is produced across the potentiometer 122. This square wave component produced across the potentiometer 122 is provided so that the desired minimum voltage of 0.4 volt may be achieved with a minimum voltage input signal from the measuring element 10 of zero, as produced, for example, by a strain gauge type of measuring unit.

During the other half cycle of the switching square wave, the transistor 110 is turned off and the transistor 111 is rendered fully conductive so that the potential across the resistor 106 is applied to the transformer winding 120 in series with the potentiometer 122. The upper end of the winding 120 is thus successively connected to either the terminal 104 or the conductor 35 so that a symmetrical square wave modulation is provided to translate the unidirectional voltage appearing between the terminal 104 and the conductor 35 into a square wave of corresponding peak-to-peak amplitude. The square wave translation is symmetrical due to the fact that the lower end of the winding 120 is connected to the junction of the resistors 105 and 106 which have equal values so that a sampling from the midpoint of the D.C. output voltage is achieved. With this arrangement low frequency modulation components which may be present in the output signal appearing across the resistors 105 and 106 is balanced out and does not appear in the square wave feedback signal which is applied back to the input stage of the instrumentation amplifier 20 for comparison purposes. Accordingly, the dynamic response of the instrumentation amplifier is substantially improved with such an arrangement. In order to provide a square wave output signal from the instrumentation amplifier 20 which may be utilized in the recorder circuit 24 and in the alarm circuit 25, the square wave signal produced at the collectors of the transistors 110 and 111 is coupled through a large coupling capacitor 130 to the square wave output terminal 131 of the amplifier 20.

Considering now the manner in which the square wave generator 80 functions to provide the above described square wave switching signals which are utilized by various windings of the transformer 82, the negative supply conductor 35 is connected through a filter circuit comprising the series resistor 135 and the shunt condenser 136 to the center tap of a primary winding 138 on the transformer 82. The upper end of the winding 138 is connected to the collector of a transistor 140 and the bottom end of the winding 138 is connected to the collector of a transistor 142. The collector of the transistor 140 is also coupled through an RC network 143 to the base of the transistor 142 and the collector of the transistor 142 is cross coupled through an RC network 145 to the base of the transistor 140 thus providing an astable oscillator circuit in which the transistors 140 and 142 are successively rendered conductive. As current is building up in one transistor the flow of current through the corresponding half of the winding 138 functions to hold the opposite transistor non-conductive until core saturation is reached, as which point the voltage across the winding 138 is reduced and the opposite transistor is rendered conductive in a similar manner. The capacitor portions of the networks 143 and 145 function to speed up the switching operation so that the square wave signal developed across the output windings of the transformer 82 has relatively steep sides. Preferably, the square wave signal developed in the transformer 82 has a frequency of approximately 3,000 cycles so that a sampling speed well above the highest response frequency of the process control system is provided.

In order to provide a highly regulated reference square wave signal, a center tapped winding 150 is provided on the amplifier output transformer 82, the ends of the winding 150 being connected through the resistors 151 and 152 to the base electrodes of a pair of transistors 153 and 154. The collector of the transistor 153 is connected to the anode of the Zener diode 41, the emitters of the transistors 153 and 154 are connected together and the collector of the transistor 154 is connected to the cathode of the Zener diode 41. Accordingly, the transistors 153 and 154 are alternately rendered conductive so as to translate the highly regulated D.C. voltage produced across the Zener diode 41 into a corresponding square wave of the same peak-to-peak amplitude. This square wave signal appears at the commonly connected emitters of the transistors 153 and 154 and is coupled through a condenser 160 to the excitation winding 161 of a zero offset and cold junction compensation transformer 162. An adjustable turn secondary winding 163 is provided on the transformer 162 to produce a variable amplitude square wave the amplitude of which may be adjusted by varying the number of turns threaded through the core of the transformer 162. In addition, another secondary winding 164 is provided on the core of the transformer 162 for developing a square wave which is applied to a voltage divider comprising the resistors 165 and 166, the resistor 165 being a wire wound resistor and the resistor 166 being of copper so that the voltage division between these resistor varies with temperature to provide the desired cold junction compensation. A tap is provided on the winding 164 which may be selected by means of the switch 167 so that a somewhat smaller cold junction compensation square wave may be provided in the event that a chromel-alumel type of thermocouple is employed instead of an iron-constantan type which produces a larger output.

The number of turns of the primary winding 161 and the secondaries 163 and 164 can be chosen to give any desired number of millivolts of zero suppression or elevation and cold junction compensation, as described in detail in the above identified copending application. However, in accordance with the present invention, the cold junction compensation square wave signal which appears across the resistor 166 and the zero offset square wave signal which appears across the winding 163 are converted to a corresponding direct current signal of proportional amplitude. This is done so that with large offset signals, i.e., conditions where the instrument zero is highly suppressed or elevated, the input stage of the instrumentation amplifier 20 is not called upon to compare a large amplitude square wave signal with the direct current signal from the measuring unit 10. In the instrumentation amplifier 20 both the zero offset square wave signal and the cold junction compensation square wave signal are rectified to provide a D.C. voltage which is connected in series with the D.C. input signal from the measuring unit 10 in the correct polarity so as to add to or subtract from this input signal and the only square wave signal which is applied to the input comparison circuit is the square wave signal developed across the winding 68 and the potentiometer 71 which represents the span of the instrument.

The input comparison circuit is thus called upon to deal with a square wave feedback signal having only an amplitude equal to the maximum span of the instrument so that switching transients which may occur at the edges of the switching square wave may be minimized. To this end, the transformer 162 is provided with a winding 170 across which is developed a square wave signal which is used to control the conduction of a switching transistor 172, the winding 170 being connected in series with a resistor 173 between the base and collector electrodes of the transistor 172. Since the square wave switching signal is derived from the same transformer as the zero offset and cold junction compensation square wave signals, the transistor 172 is turned on or rendered highly conductive in synchronism with these square wave signals. The emitter-collector circuit of the transistor 172 is connected in series with the resistor 166, the winding 163 and the condenser 74 so that there is produced a unidirectional voltage across the condenser 74 which is proportional to the amplitude of these square wave signals. In this connection it will be understood that the polarity of the windings 163 and 164 are so chosen that the voltage produced across the condenser 74 is of the correct polarity to either subtract from or add to the output signal from the measuring unit 10, depending upon whether a zero suppression or a zero elevation function is desired.

In certain instances it is desirable to detect when the process variable has reached a predetermined value. This value may either be within the normal range of the instrument or may be some value outside this normal range beyond which the process should not be permitted to continue. With the square wave type of output signal derived at the terminal 131 of the instrumentation amplifier 20, a predetermined control point or alarm point may be conveniently provided by employing a separate reference point transformer indicated generally at 180, the transformer 180 having a primary winding 181 which is connected between the condenser 160 and the conductor 35 so that the highly regulated 5.6 volt square wave is applied to the winding 181.

An adjustable turn secondary winding 182 is provided on the core of the transformer 180 and the turns ratio of the windings 181 and 182 is so chosen that each turn of the secondary winding 182 represents a predetermined percentage of full scale of the instrument. For example, if a measurement range of 1.6 volts, i.e., from 0.4 to 2.0 volts, is used and the primary winding 181 has 140 turns, then each turn of the secondary winding 182 will represent approximately two percent of the span of the instrument with a 5.6 volt square wave applied to the winding 181. There is thus provided a very convenient arrangement whereby the user may establish an alarm point at any predetermined amplitude level either within the measuring range of the instrument or outside this range. Furthermore, several alarm points may be separately established by merely providing other adjustable secondary windings, similar to the winding 182, and employing the square wave developed across these windings for different alarm functions. In the illustrated embodiment the process square wave which appears at the terminal 131 is compared with the alarm point square wave developed across the winding 182 by means of a resistor summation network which includes the resistors 185 and 186, the summation of these two square waves being applied to an amplifier 187, the output of which is connected to a phase demodulator 188. When the process square wave exceeds the amplitude of the alarm point square wave developed across the winding 182 the phase of the demodulated signal will reverse so as to actuate an alarm relay 189 or other suitable form of indicator device.

Considering now the manner in which the process control system of the present invention is controlled to a predetermined electrical set point, the voltage output from the instrumentation amplifier 20 appears between the terminal 104 and the conductor 35 and is indicated on the process meter 200. Since the cascade control resistor 51 in the electrical set point circuit 23 is also connected to the conductor 35, the voltage between the arm of the potentiometer 50 and the positive terminal of the meter 200 will indicate the deviation of the process from the desired electrical set point as established by the position of the arm of the potentiometer 50. This deviation or error signal is indicated on the meter 201 and the resultant error signal is then applied to the controller 21 through a polarity reversing switch indicated generally at 202. In accordance with an important feature of the invention, the error signal developed across the meter 201 will not be affected by any variation in energization of the measuring element 10 due to the above described series connection of the strain gauge measuring element 10 with the set point potentiometer 50 and the current regulating transistor 42. In this connection it will be understood that since the measuring element 10 is a very low level device any fluctuations in the energizing voltage supplied to this unit would normally produce errors in the process control system due to the fact that corresponding voltage variations in the output signal of the measuring unit 10 would be falsely interpreted as a variation in the process. Furthermore, the controller 21 is susceptible to very small transient errors because of its high gain and its response to the first derivative components of the error signal. However, in accordance with the above described series connection of the measuring unit 10 and the set point potentiometer 50 with the current regulating transistor 42, if the current supplied to the measuring unit 10 varies so as to produce a variation in the output signal appearing upon the conductors 15 and 16 thereof, a corresponding variation will be produced in the electrical set point signal produced across the potentiometer 50 with the result that no corresponding variation in the error signal produced across the meter 201 will be experienced. It will also be noted that the current supplied to the measuring unit 10 is quite highly regulated due to the fact that it is derived from the voltage produced across the Zener diode 41 so that only slight variations in current applied to the strain gauge measuring element 10 will be experienced. However, even these slight variations will not produce fluctuations in the error signal supplied to the controller 21 for the reasons described in detail above. It will also be noted that with the measuring unit 10 in series with the electrical set point circuit 23 the current drain on the power supply is substantially reduced so that the overall current requirements of the system are small and an intrinsically safe process control system is provided which may be serviced while in operation.

In order to provide an adjustment for the span of the set point potentiometer 50 so that this potentiometer may be adjusted to a particular dial arrangement, there is provided a potentiometer 205 which is connected across the series combination of the resistor 51 and the potentiometer 50. Variation of the trim span potentiometer 205 will vary the current flowing through the potentiometer 50 so that the electrical span of this potentiometer can be adjusted as desired.

The resistor 51 is provided so that a cascade type of process control can be produced in which the controller 21 is made to control to a set point represented by the combination of the setting of the potentiometer 50 and the output from a preceding controller. For example, the measuring unit 10 may correspond to a measurement of flow and a preceding controller (not shown) which is responsive to temperature may supply a standard output current signal having a range of from 1 to 5 milliamperes which is connected to a cascade input terminal 206, this cascade controller current flowing through the resistor 51 to the negative supply conductor 35 so as to set up a voltage across the resistor 51 proportional to the output of the preceding controller. Preferably, the resistor 51 has a value of 400 ohms so that a current flow of from 1 to 5 milliamperes through this resistor produces a voltage thereacross of from 0.4 volt to 2.0 volts, i.e., a voltage range corresponding to that set up across the set point potentiometer 50. It will be noted that if the output of the preceding controller goes to zero a minimum set point setting is still available which is proportional to the setting of the set point potentiometer 50.

Considering now the circuit arrangement of the controller 21, the direct current error signal produced in the manner described above by comparison of the electrical set point signal with the output of the instrumentation amplifier 20 is applied to a converter or modulator which has a high input impedance so that rate and reset control components may be developed, as will be described in more detail hereinafter. Specifically, the input error signal together with a feedback signal to be described in more detail hereinafter are applied to a pair of diode switching circuits the switching time of which is controlled by the highly regulated square wave produced at the terminal 211 of the instrumentation amplifier 20. More particularly, a filter condenser 212 is provided at the input of the diode switching circuit and the upper terminal of the condenser 212 is connected to the anode of a first switching diode 214 and the bottom end of the condenser 212 is connected to the anode of a second switching diode 216. A switching transformer indicated generally at 218 is provided with a primary winding 219 to which the regulated square wave signal is supplied from the instrumentation amplifier 20 and is provided with a pair of secondary windings 220 and 221 which control respectively the conduction of the diodes 214 and 216. A condenser 222 is connected across the series combination of the secondary winding 220 and the diode 214 and a condenser 223 is connected across the series combination of the diode 216 and the winding 221. An adjustable capacitor 224 is connected across the capacitor 223 and a further balancing capacitor 225 is arranged to be connected either to the winding 220 or the winding 221 so that balanced operation of the switching circuit may be achieved. The windings 220 and 221 are preferably bifilar wound on the core of the transformer 218 and the primary winding 219 thereof is preferably shielded by means of a shield 226 from the secondary windings 220 and 221, the shield 226 being connected to the plus terminal side of the winding 219. The diodes 214 and 216 are of the voltage sensitive type and are preferably of the type V100 semiconductor diodes manufactured by Pacific Semiconductors Inc., Culver City, California. The cathodes of the two diodes 214 and 216 are connected to the upper and lower ends respectively of the primary winding 230 of an output transformer 231, the secondary winding 232 of which is connected to an A.C. amplifier 233.

Preferably the transformer 231 is positioned within a magnetic shield 234 and the primary winding 230 thereof has relatively low capacity with respect to the core of the transformer so that a large capacity to ground is avoided and the pickup of extraneous voltages is minimized. With no input to the diode switching circuit, the capacitors 222 and 223 are quickly charged up through the diodes 214 and 216 to the peak amplitude of the square wave signal developed across the windings 220 and 221. The capacitor 224 may be adjusted so that the voltages at the cathodes of the two diodes 214 and 216 are equal with no signal applied. In addition, the capacitor 225 may be connected either to the bottom end of the winding 220 or the top end of the winding 221 depending upon the capacity to ground condition of these windings so that an exact balance of voltages can be obtained with the result that no signal will be produced in the transformer winding 230.

The diodes 214 and 216 are both rendered conductive in unison by the square wave signals produced across the windings 220 and 221 but these diodes only conduct for a period of time necessary to restore the charge on the condensers 222 and 223 which is lost during the half cycle in which the diodes 214 and 216 are non-conductive. During the negative half cycles of the square wave signals the diodes 214 and 216 are rendered highly nonconductive so that a high leakage path is provided for the capacitors 222 and 223. Accordingly, these capacitors lose very little charge during the negative half cycles of the square wave signals. However, on the conductive half cycles in which the diodes 214 and 216 are brought to approximately zero bias, a charge is supplied to the condensers 222 and 223 of sufficient amount to restore the voltage across these capacitors to the peak amplitude of the square wave signals. When a D.C. input signal is applied across condenser 212 to the anodes of the diodes 214 and 216, these diodes respond thereto by a variation in impedance thereof which affects the voltage division between the diode and its associated capacitor with the result that a square wave signal is produced in the primary winding 230 of the transformer 231 which is proportional in amplitude to the value of the direct current input signal.

This square wave signal is then amplified in the A.C. amplifier 233, which may comprise a series of three transistor amplifier stages of conventional design, and the output of the amplifier 233 is connected through a capacitor 240 to the primary winding 241 of a transformer 242 having a center tapped secondary winding 243. A pair of transistors 245 and 246 are rendered conductive by means of a control transformer 250 which is provided with a center tap secondary winding 251 the upper end of which is connected through a resistor 252 to the base of the transistor 246 and the bottom end of which is connected through a resistor 253 to the base of the transistor 245. The regulated square wave reference signal is applied to the primary winding 256 of the transformer 250 so that the transistors 245 and 246 are alternately rendered conductive. When these transistors are rendered conductive they function successively to connect the opposite ends of the secondary winding 243 to terminal 35 so that a circuit is established through the conductor 257 connected to the center tap of the winding 243 and an output filter condenser 258 back to the terminal 35. Accordingly, the square wave signal impressed upon the winding 241 is full wave demodulated by means of the transistors 245 and 246 so as to provide across the condenser 258 a unidirectional voltage of an amplitude proportional to the amplitude of the square wave output signal from the amplifier 233. A diode 260 is connected across the capacitor 258 so as to prevent the voltage across the capacitor 258 from developing in a polarity opposite to its normal working range. The diode 260 thus permits the capacitor 258 to recover quickly from an overload condition in one direction. The voltage developed across the capacitor 258 is applied to the base electrode of a D.C. amplifier transistor 262 in the collector circuit of which there is provided a resistor 263 and in the emitter circuit of which there is provided a resistor 264.

The transistor 262 amplifies the D.C. voltage developed across the capacitor 258 and in order to minimize current drain on the capacitor 258 the transistor 262 is operated as an emitter follower and is of the PNP type as shown in the drawing. The resistor 263 is of a sufficient value to limit the development of overvoltage in the normal direction so that recovery from an overload in either direction is relatively quick. The voltage appearing across the emitter resistor 264 of the transistor 262 is applied to the base of a D.C. voltage amplifier transistor 266, the emitter of which is connected to the negative terminal 35 of the power supply through a resistor 267 and the collector of which is connected to the plus common terminal of amplifier 233 through a pair of resistors 268 and 269. The transistor 266 thus provides sufficient voltage gain so that only part of the required system gain need be attained in the A.C. amplifier portion 233 which is subject to overloading at its output when its gain is very high.

The voltage developed across the collector resistor 269 of the transistor 262 is applied through a manual-to-automatic changeover switch indicated at 270 to the base electrode of an emitter follower transistor 271 in the collector circuit of which an output current of 1 to 5 milliamperes range is provided as indicated by the meter 272, a suitable output load circuit being connected between the terminal 273 and the minus supply conductor so as to complete the current path of the transistor 271. For example, the output load circuit may comprise a suitable current responsive valve positioner located in the process area, as will be readily understood by those skilled in the art. An emitter resistor 275 is connected between the emitter of the transistor 271 and power supply output terminal 36. The voltage applied to the base of the transistor 271 is also applied to a second transistor 280 which provides in the collector circuit thereof a voltage suitable for feedback purposes. More particularly, the emitter of the transistor 280 is connected to power supply output terminal 36 through the resistor 281 and the collector of this transistor is connected through a resistor 283 to the minus supply conductor 35. The transistors 271 and 280 thus function to separate the output load circuit of the controller 21 from the proportional band, reset and rate function components in this controller. Furthermore, it should be noted that the provision of separate output circuits for the output load of the controller 21 and the feedback network by means of separate transistors has the additional advantage that the supply voltage may be small enough to provide an intrinsic safety type of process control system. If these two output circuits were derived from a common output amplifier the power supply voltage requirements would be so great as to exceed the value necessary to provide an intrinsic safety process control system.

It will be noted that the feedback voltage developed across the resistor 283 is permanently connected to the negative supply conductor 35. On the other hand, in the arrangement of the present invention both the set point circuit 23 and the output circuit of the amplifier 20 have one output terminal thereof connected to the negative supply conductor 35 also. Accordingly, since the feedback voltage must be added serially to the set point voltage and the output of the amplifier 20 at the input of the controller, it is necessary to provide a D.C. isolation circuit in the feedback signal path of the controller 21. With such an isolation circuit in the feedback path of the controller, it is also possible to reverse the control action of the controller 21, it being understood that such control action may be in one direction or the other, depending upon the process being controlled. Such reversal of the action of the controller 21 is effected by means of the reversing switch 202. To such ends, a series of four transistors 290, 291, 292 and 293 are provided. The transistors 290 and 291 are serially connected to the upper end of the resistor 283 and the transistors 292 and 293 are serially connected to the bottom end of the resistor 283, i.e., the conductor 35.

The transistors 290, 291, 292 and 293 are controlled by a switching square wave in such manner that the transistors 291 and 293 are first rendered conductive during one portion of the square wave switching waveform and the transistors 290 and 292 are subsequently rendered conductive while the transistors 291 and 293 are non-conductive. A first capacitor 295 is connected between the collector electrodes of the transistors 291 and 293 and a second condenser 296 is connected between the emitters of the transistors 290 and 292. In order to control the conduction periods of the transistors 290, 291, 292 and 293 there is provided a switching transformer indicated generally at 300 having a first center tapped winding 301, the ends of which are connected through the resistors 302 and 303 to the base electrodes of the transistors 292 and 293 and the center tap of which is connected to one end of the condenser 295. The transformer 300 is also provided with a second center tapped winding 305 the ends of which are connected through the resistor 306 to the base electrode of the transistor 290 and through a resistor 307 to the base electrode of the transistor 291, the center tap of the winding 305 being connected to the other end of the capacitor 295. The primary winding 310 of the transformer 300 is energized from the highly regulated reference square wave signal produced at the terminal 211 in the instrumentation amplifier 20 so that square wave signals of like phase are produced across both the windings 301 and 305.

Considering now the operation of the above described D.C. isolation circuit including the transistors 290, 291, 292 and 293, the transistors 291 and 293 have similarly polarized square waves applied between their base and collector electrodes so that these transistors are rendered simultaneously highly conductive. It will be noted that the transistors 291 and 293 are operated in the inverted form in which the switching waveform is applied between the collector and base electrodes of the transistors so that a very small voltage drop in the order of 1 millivolt is produced between the collector and emitter of the conductive transistors. Accordingly, the D.C. voltage which appears across the resistor 283 is transferred to the capacitor 295 without substantial change thereto during the period when the transistors 291 and 293 are rendered highly conductive. During the opposite half cycle of the switching square wave, transistors 291 and 293 are turned off, and the transistors 290 and 292 are rendered highly conductive by means of similarly poralized square waves which are applied, between the collector and base electrodes of the transistors 290 and 292. Accordingly, during periods when the transistors 290 and 292 are highly conductive the voltage present across the capacitor 295 is transferred to the capacitor 296 without substantial change thereto. However, since the transistors 290 and 292 never conduct simultaneously with the transistors 291 and 293 there is no D.C. voltage path established between the resistor 283 and the capacitor 296 with the above discussed advantages resulting therefrom.

The isolation circuit which includes the transistors 290, 291, 292 and 293 is particularly suitable for the circuit arrangement of the controller 21 in that the switching transients in the second transistor switching section which includes the transistors 290 and 292 may have relatively small amplitudes so that these switching transients and components of the square wave signal itself do not interfere with the proper operation of the high input impedance modulator including the diodes 214 and 216. More particularly, the capacitor 296 preferably has a value of 0.047 microfarad whereas the capacitor 295 has a value of 0.22 microfarad. With this arrangement the current required to charge the capacitor 296 is much smaller so that any switching transients which are produced are of relatively low amplitude. Accordingly, the voltage across the small capacitor 296 is relatively free from switching transients and components of the square wave signal even though a square wave switching arrangement is employed for D.C. isolation between the capacitor 296 and the resistor 293.

The voltage appearing across the capacitor 296 in the feedback loop of the controller 21 is now modified in waveform to provide proportional band, reset and rate components. More specifically, the voltage across the capacitor 296 is applied to a proportional band potentiometer 282 in series with a resistor 284. A variable portion of the voltage appearing across the resistor 283 is thus produced at the arm of the potentiometer 282 which may be adjusted as desired to provide the required proportional band setting. The voltage produced at the arm of the potentiometer 282 is then applied to a series reset condenser 330 which is connected in series with a potentiometer 332 and a resistor 331 to the midpoint of a voltage divider comprising the resistors 334 and 335 which are connected across the input of the controller 21. Preferably, the resistors 334 and 335 have such a value that only a fraction of the input voltage is applied to the reset potentiometer 332. For example, the resistor 334 may have a value of 15,000 ohms and the resistor 335 may have a value of only 10,000 ohms so that only two-fifths of the input signal is applied to the reset network. With this arrangement the reset time provided by the capacitor 330 and the potentiometer 332 is two and one-half times the actual time constant value of the capacitor 330 and the potentiometer 332. In this connection it will be understood that whereas the condenser 330 and the potentiometer 332 form a conventional differentiating circuit, since this circuit is included in the feedback path of the controller 21 an integrating or reset action component is produced in the output signal of the controller.

In order to provide a rate action component in the output signal of the controller, the voltage appearing across the reset potentiometer 332 and the resistor 331 is applied to a rate potentiometer 323 which is connected in series with a resistor 321 to a rate condenser 322, the bottom end of which is connected to one input terminal of the controller. With this arrangement the feedback signal is further modified by providing an integrating component in the feedback path which results in a differentiated or rate action component in the output signal of the controller.

It will be evident from the above that in the controller 21 a closed loop carrier amplifier arrangement is employed in which the D.C. input signal is first converted to a carrier or square wave signal, is then amplified to a suitable level and is demodulated by means of a synchronous demodulator to recover the original D.C. voltage in amplified form. In such an arrangement a filter is required at the input of the diode switching circuit which includes the diodes 214 and 216 so as to filter any square wave frequency noise signals coming from either the set point signal source, the output of the amplifier 20, or the feedback network in the controller 21, which three signals are summed at the input of the controller. A second filter is required to smooth the output of the demodulator circuit including the transistors 245 and 246 so that the subsequent D.C. amplifier stages 262, 266 and 271 are not overloaded by square wave frequency voltages. These two filter circuits each introduce a phase lag in the amplifier loop. In addition, the rate function network comprising the potentiometer 323 and the condenser 322 in the feedback network introduces an additional phase lag in the amplifier loop. To avoid instability of one of these phase lags must dominate, that is, its time constant must be slower than the time constant of the other phase lags by an amount at least equal to the open loop gain of the amplifier portion of the controller 21 which, in a typical instance, is more than 400. In accordance with this invention, the rate function network including the potentiometer 323 and the condenser 322 is caused to function as the dominant phase lag of the amplifier loop and also as a portion of the input filter required at the input of the diode switching circuit so that instability is avoided without providing a separate filter having a long time constant. Also, when no rate function is required in the controller the condenser 322 is disconnected from the bottom input terminal of the controller 21 and is connected as shown in dotted lines in the drawing so that it is in parallel with the condenser 212. Under these conditions, i.e., without any rate action component, the condenser 322 together with the potentiometer 323, which is adjusted to place its maximum resistance in the circuit, functions as the dominant phase lag filter to filter all of the input signals applied to the input of the controller without modifying the feedback voltage for rate action. It will thus be evident that the rate component network when used as such also serves as one of the square wave frequency filters and when rate response is not required this network can be reconnected in such a way that it still functions as a square wave frequency filter which provides the dominant phase lag of the amplifier loop.

In order to provide for manual control of the process there is provided the manual-to-automatic changeover switch 270 and the manual positioner 22. More specifically, the positioner 22 comprises a resistor 340 in series with a Zener diode 341 which are connected between the negative supply conductor 35 and the positive common terminal 36. A resistor 342 in series with a manual control potentiometer 343 is connected across the diode 341 so that an accurately regulated but adjustable current is developed at the arm of the potentiometer 343. This adjustable current is supplied to the base electrode of a transistor 344 the emitter of which is connected to the common or positive power supply output conductor 36 through a resistor 345. The collector of the transistor 344 is connected to the contact 346 of the switch 270 so that when this switch is in the manual position an adjustable manual control current is supplied to the transistors 271 and 280 in place of the automatic control current normally supplied from the transistor 266. The changeover switch 270 is provided with a second set of contacts 347 which are closed when the switch 270 is thrown to the manual position so that the potentiometer 332 and resistor 331 are short circuited and the condenser 330 is permitted to follow more rapidly the variations in process current effected by manipulation of the manual control potentiometer 343. When changing from automatic to manual operation, the operator observes a balance meter 350 which is permanently connected between the collector of the transistor 266 and the arm of the potentiometer 343 so that when this meter reads zero the manual control voltage is equal to the voltage produced in the controller 21 at the collector of the transistor 266 and the switch 270 may be thrown to the manual position without causing an abrupt variation in the process. Preferably, both the meters 201 and 350 comprise small, inexpensive meters which are permanently connected in the circuit so that no meter switching is required when going from manual to automatic operation and vice versa.

It will be noted that in the arrangement of the present invention the amplifier portion of the controller 21, which includes the amplifier 233 and the transistors 262 and 266, is not utilized during manual operation for the charging of the reset condenser 330 but instead the current developed by the manual control unit 22 is employed as a source of charging current for this condenser by way of the transistor 280 and the isolation circuit which includes the transistors 290, 291, 292 and 293. Accordingly, this amplifier portion of the controller 21 is, in accordance with a feature of the present invention, used during manual control to amplify the error or deviation signal, which is normally read on the meter 201, so that a very sensiitve indication is provided by the meter 350 of the difference between the process variable and the desired set point and a very accurate transfer from manual to automatic operation can be made. The accuracy of this transfer is quite high because the feedback network, which includes the above described proportional band, rate and reset components, is not connected between the output and input of the amplifier portion of the controller 21 during manual operation so that this amplifier portion operates at full gain during manual operation. The meter 350 thus acts as a vernier indication for the meter 201 and permits very accurate transfer from manual to automatic operation. In addition, the reset condenser 330 is continuously charged in accordance with the value of the manual control current at any instant so that no abrupt variation in the process is produced when changing from manual back to automatic operation.

As stated heretofore, the power supply 26 is arranged to provide a unidirectional potential between the conductors 35 and 36 of the polarity indicated and having an amplitude of 19.6 volts. It will also be noted that all of the above described components of the process control system of the present invention perform properly with a maximum voltage of less than 20 volts applied thereto. In accordance with a further feature of the invention, an arrangement is provided in the power supply 26 so that the maximum current which can be drawn from the power supply 26 by way of the conductors 35 and 36 is limited to 200 milliamperes even when these conductors are short circuited so that the instrinsic safety of the system is assured insofar as short circuits, hot wires, arcing contacts and the like are concerned. In addition, this limitation of the maximum current which can be drawn from the power supply 26 is achieved while providing a regulation of the voltage produced between the conductors 35 and 36 so that the power supply 26 can be operated from a conventional 110 volt unregulated supply. More particularly, the secondary winding 360 of a power transformer 361 is connected to a pair of power rectifiers 362 and 363 so that a full wave rectified voltage is provided across the filter condenser 364. A series connected regulating transistor 365 is connected between the filter condenser 364 and the output filter condenser 370 of the power supply 26. More particularly, the collector of the transistor 365 is connected to one end of the condenser 364 and a resistor 371 is connected from this junction to the base electrode of this transistor 365. The emitter of the transistor 365 is connected to one end of the condenser 370. A voltage divider comprising the resistors 374 and 375 is connected across the condenser 370 and a control transistor 378 is connected between the base electrode of the series regulating transistor 365 and the other side of the condenser 364, this point being the positive common terminal of the power supply 26. The collector of the transistor 378 is connected to the base of the transistor 365 and a Zener diode 380 is connected between the emitter of the transistor 378 and the common plus terminal, the base of the transistor 378 being connected to the junction of the resistors 374 and 375. Preferably the resistor 375 is made variable so as to adjust the regulated voltage appearing across the capacitor 370. Briefly considered, if the output voltage across the capacitor 370 starts to vary the voltage drop across the resistor 375 will vary which changes the current flow through the transistor 378 and hence the current drop across the series connected transistor 365 in the correct direction to maintain the voltage across the capacitor 370 constant.

In order to provide an arrangement wherein the current which may be drawn through the conductors 35 and 36 is limited to a maximum value of 200 milliamperes, there is provided a small resistor 381 in series with the capacitor 370 to the negative potential supply conductor 35 and a control transistor 382 is provided, the base-emitter circuit of the transistor 382 being connected across the resistor 381. The transistor 382 is normally biased to a non-conductive state. However, when the current through the resistor 381 reaches 200 milliamperes a voltage is produced across this resistor which is sufficient to cause the transistor 382 to conduct current. The collector of this transistor is connected to the junction of the base electrode of the transistor 365 and the collector of the transistor 378. Accordingly, when the transistor 382 draws current a voltage drop is produced across the resistor 371 which is sufficient to lower the voltage produced across the capacitor 370 so as to prevent the maximum current vallue of 200 milliamperes from being exceeded. As soon as the short circuit or overload condition is removed the transistor 382 ceases to conduct and the voltage regulated circuit operates in the normal manner. It will be noted that this current limiting circuit protects the load circuit connected to the output of the controller 21 as well as the component circuits of the process control system shown in the drawings.

In order to provide a power standby arrangement whereby the process control system of the present invention can be operated from a standby battery during periods when the main power supplied to the power supply 26 is not functioning, there is provided a standby battery 390, preferably a nickel cadmium cell of small dimensions, the positive terminal of which is connected to the common plus terminal and the negative terminal of which is connected through a resistor 391 to the negative side of the condenser 364. The negative side of the battery 390 is also connected through a diode 392 to the negative side of the condenser 370 and a resistor 393 is connected across the diode 392. Assuming that the battery 390 is not fully charged when it is inserted in the circuit, a voltage will be established at the junction point between the resistors 391 and 393 which will be somewhat more negative than the voltage produced across the condenser 370 and the battery 390 will be charged relatively rapidly through the small resistor 393. As the battery voltage approaches the voltage across the capacitor 370 the current through the resistor 393 diminishes and a charging current is established through the resistor 391 which is sufficient to cause the battery 390 to assume a voltage slightly more negative than the potential across the capacitor 370. If the voltage across the condenser 370 disappears, as when the power supplied to the power supply 26 fails, the diode 392 conducts so as to place the battery potential across the condenser 370 and hence apply this potential through the resistor 381 to the conductors 35 and 36 so that the process control system functions in the normal manner. It will be noted that since the current required by the various elements of the system is relatively small the battery 390 may be of reasonable size and yet function to maintain the system in proper operation for periods up to an hour of power failure. When power is resumed the voltage across the condenser 370 increases slightly so that the diode 392 is rendered non-conductive and the battery thereafter does not supply current to the process control system. However, it will be understood that the battery 390 is maintained fully charged for standby operation by means of the above described charging circuit.

Considering now the details of the electronic recorder 24, it is first pointed out that this recorder is particularly suitable for use in an electronic process control system wherein the total current drain is limited in the manner described in detail heretofore in connection with the power supply 26 so as to provide an intrinsically safe process control system. Specifically, the recorder 24 comprises a square wave amplifier 400, a pen drive amplifier 401, a pen motor 402 and a position translating unit 403. The square wave output signal which is produced at the terminal 131 of the instrumentation amplifier 20 and has a peak-to-peak amplitude proportional to the process variable being measured, is supplied by way of the conductor 405 and through a first branch of a mixing network comprising a condenser 406 and a resistor 407 to the input of the square wave amplifier 400. Also, the highly regulated square wave signal developed at the terminal 211 of the instrumentation amplifier 20 is connected by way of the conductor 410 to both the unit 403 and the pen drive amplifier 401.

The recorder 24 employs an electrical null balance system wherein the input square wave from the instrumentation amplifier 20 is compared with a square wave representing the actual position of the recording pen and the resultant error signal is employed to position the pen for a minimum error or null. Considering first the manner in which the position of the recording pen is translated into a square wave having an amplitude corresponding to pen position, the stator windings 412 and 413 of the translating unit or pickoff unit 403 are supplied with the highly regulated square wave appearing upon the conductor 410 so that a corresponding magnetic field is set up across the rotor 415 with the result that the rotor winding 416 has induced therein a square wave signal the amplitude of which varies with the position of the rotor 415 relative to the stator. The constructional features of the pen motor 402 and the position translating unit 403 are shown in FIGS. 5 to 9, inclusive, of the drawings and, as best illustrated in FIG. 6 of the drawings, both the rotor 415 and the stator 420 of the unit 403 are of laminated construction and are made of magnetic material having very high initial permeability so that the square wave induced in the rotor winding 416 has relatively steep sides and flat top portions.

When the recording pen is at mid-scale the rotor 415 is in the position shown in FIGS. 3 and 8 and the square wave signal induced in the rotor winding 416 has a value midway between its maximum and minimum values. The regulated square wave signal is also applied to a voltage divider arrangement comprising a resistor 422, a potentiometer 423 and a resistor 424, one side of the rotor winding 416 being connected to the junction of the resistor 422 and the potentiometer 423 and a resistor 425 being connected across the rotor winding 416. A constant but adjustable square wave signal is produced across the potentiometer 423 and the resistor 424 and this fixed square wave signal is combined with the square wave component produced across the rotor winding 416 and the resistor 425 in parallel and the composite square wave signal is applied through a fine span adjustment potentiometer 426 to the second branch of the input mixing circuit comprising a condenser 428 and a resistor 429 in the input circuit of the square wave amplifier 400. The input square wave signal from the instrumentation amplifier 20 is thus compared with the square wave feedback signal derived from the unit 403 and the resultant square wave error signal is amplified in the square wave amplifier 400.

The amplifier 400 may comprise a series of three transistor stages substantially identical to those described heretofore and in the above identified copending application. The output square wave signal from the amplifier 400 is connected by way of a conductor 430 and through condensers 431 and 432 to the collectors of a pair of transistors 433 and 434 respectively. The emitters of the transistors 433 and 434 are connected to ground so that when the transistor 433 is rendered conductive it functions to short-circuit the condenser 431 to ground and when the transistor 434 is rendered conductive it functions to short-circuit the condenser 432 to ground. The regulated square wave signal appearing on the conductor 410 is also supplied to the primary winding of a coupling transformer 435, the secondary of which is connected to the base circuits of the transistors 433 and 434 so that these transistors are alternately rendered conductive. Accordingly, if the error signal on the conductor 430 is of one phase the transistor 433 will function to demodulate the error signal so that a unidirectional voltage of one polarity is produced across the output condenser 440 and the transistor 434 functions to demodulate the error signal so that the unidirectional voltage of the opposite polarity is produced across the output condenser 441. On the other hand, if the error signal is of the opposite phase the transistors 433 and 434 will function to reverse the polarities of the signals developed across the condensers 440 and 441. The diodes 442 and 443 are connected between the respective transistors and their associated output condensers so that a voltage doubler action is provided whereby the output voltage across the condensers 440 and 441 is substantially increased.

The unidirectional voltages appearing across the condensers 440 and 441 are amplified in the output transistors 445 and 446, respectively, the collector of the transistor 445 being connected to one end of the rotor winding 450 of the pen motor unit 402 and the collector of the transistor 446 being connected to one end of the rotor winding 451 of the pen motor unit 402, the other ends of the windings 450 and 451 being connected to the negative supply conductor 35. The emitters of the transistors 445 and 446 are connected through a common resistor 447 to ground so that in the absence of any voltages developed across the condensers 440 and 441 the transistors 445 and 446 are drawing very little current and the rotor 455 of the pen motor 402 occupies the mid-position shown in FIGS. 3 and 7. If the error signal on the conductor 430 is of one polarity the voltage across the condenser 440 will increase negatively so that the transistor 445 draws more current while, at the same time the voltage across the condenser 441 increases positively. However, this positive increase in voltage across the condenser 441 has little effect since it merely causes the transistor 446 to cease conducting. The net result is that the current in the rotor winding 450 increases substantially so that a magnetic field is set up which moves the rotor 465 in one direction from its mid-position. If the error signal is of the opposite phase the voltages developed across the condensers 440 and 441 are reversed in polarity so that the transistor 446 draws more current while the transistor 445 is biased non-conductive and a field is set up by the rotor winding 451 which moves the rotor 455 in the opposite direction. It will, of course, be understood that the phase of the error signal will vary depending upon whether the input signal is larger than the feedback signal or is smaller than the feedback signal and the system will act to position the recording pen in accordance with the amplitude of the square wave input signal on the conductor 405. A diode 460 is connected between the negative supply conductor 35 and the collector of the transistor 445 and a diode 461 is connected between the collector of the transistor 446 and the conductor 35. The diodes 460 and 461 are provided for the purpose of suppressing inductive transients which might be set up in the rotor windings 450 and 451 and would tend to damage the transistors 445 and 446.

From the foregoing description of the recorder 24, it will be noted that the input square wave appearing upon the conductor 405 is balanced by the feedback square wave derived from the unit 403 so that during most of the operating periods of the recorder 24, i.e. when the recording pen is standing still or moving slowly, only a very small current is drawn from the power supply 26. This is because the amplifier 400 provides substantial amplification for the square wave error signal and the rotor windings 450 and 451 preferably comprise a relatively large number of turns each so that only a small current flow through either of these windings is sufficient to cause a deflection of the recording pen. Accordingly, it is only when the recording pen is called upon to move abruptly that any substantial current is drawn by the recorder 24 and this current is itself limited by virtue of the arrangement provided in the power supply 26 as described in detail heretofore in connection with this portion of the process control system. During most situations wherein the recording pen is called upon to move very slowly, the recorder 24 draws an extremely small amount of current from the power supply 26 due to the high gain provided within this recorder for the square wave input signal and the square wave null balancing arrangement described in detail heretofore.

Considering now the constructional arrangement of the pen motor unit 402 and the position translating unit 403 shown in FIGS. 5 to 9 of the drawings, these two units are preferably mounted as an integral unit indicated generally at 465 in these figures. Specifically, the pen motor unit 402 comprises a pair of solid semi-cylindrical housing members 466 and 467 of cold rolled steel between the opposed edges of which there are positioned a pair of elongated permanent magnets 468 and 469. The rotor 455 of the pen motor unit comprises a series of laminations which are mounted on a rotor shaft 470, the upper end of which is rotatably mounted in a ball bearing unit 471 mounted in a top plate 472 of the unit 465. The upper end of the shaft 470 is arranged to be connected by means of a suitable linkage including the arm 475 to the actual recording pen of the recorder, as will be readily understood by those skilled in the art. The rotor laminations 455 are provided with dividing ridge portions 476 which facilitate the winding of the rotor windings 450 and 451 around these laminations. As indicated heretofore, the rotor windings 450 and 451 preferably comprise a relatively large number of turns of fine wire so that a relatively large torque is produced in response to a small current flow through either of these windings. In order to limit the travel of the rotor 455 a pair of indexing pins 480 and 481 are provided in the members 466 and 467, respectively, so that the rotor 455 is permitted to travel through an arc of only approximately 30°.

The shaft 470 is supported at its bottom end by means of a second ball bearing unit 485 which is mounted in the top plate portion 486 of the position translating unit 403, the plate 486 interfitting with the bottom opening formed by the members 466 and 467 of the pen motor unit 402. The stator laminations 420 of the position translating unit 403 are positioned between a sleeve portion 487 attached to the top plate 486 and a flanged sleeve portion 488, these members being held together by means of an encapsulating compound 489 which surrounds the stator laminations 420, the stator coils 412 and 413 and a pair of sleeves 490 and 491 which receive a pair of studs 492 and 493 which are threaded into the members 466 and 467 of the unit 402 so as to provide a unitary structure. The rotor laminations 415 of the translating unit 403 are secured on an extension 498 of the shaft 470 and the rotor 415 is secured to this shaft by means of a threaded member 500 which projects below the unit 403.

A motor damping unit indicated generally at 505 is secured to the flanged member 488 by means of the bolts 506 and comprises a bottom member 507 having inwardly projecting portions 508 which cooperate with a top plate 509 to form a plurality of arcuate chambers 510 which are filled with a suitable viscous fluid. A vaned damping member 512 is secured to the end of the stud 500 by means of a set screw 513 so that the damping member 512 rotates with the shaft 470. The passageways 515 between the damping member 512 and the projections 508 and the passageways 516 between the vaned portions 512 and the outer edge portions of the bottom member 507 are preferably sufficiently small that a substantial damping action is produced as the shaft 470 is rotated. Accordingly, sufficient inertia is given to the feedback loop in the recorder 24 so that instability and hunting is avoided.

While the present invention has been described by means of certain preferred embodiments, many modifications will occur to those skilled in the art. It will be understood, of course, that it is not desired that the invention be limited thereto since modifications may be made, and it is, therefore contemplated by the appended claims to cover any such modifications as fall within the true spirit and scope of the invention.

What is claimed as new and desired to be secured by Letters Patent of the United States is:

1. In a process control system, an electronic recorder comprising an amplifier, means for applying an input square wave signal having an amplitude proportional to a measured variable to the input of said amplifier means, push-pull demodulator means connected to the output of said amplifier means and arranged to develop a direct current output signal proportional to the output of said amplifier means, a shaft having a recording element connected thereto, electromagnetic means for deflecting said shaft in accordance with the value of said direct current output signal, a square wave reference signal source of constant amplitude, stationary winding means surrounding said shaft, a rotor winding carried by said shaft and electromagnetically coupled to said stationary winding means, means for connecting said square wave reference signal to said stationary winding means so as to induce a square wave feedback signal in said rotor winding the amplitude of which is proportional to the position of said shaft, and means for applying said square wave feedback signal to the input of said amplifier means in opposition to said input square wave signal.

2. In a process control system, an electronic recorder comprising an amplifier, means for applying an input square wave signal of predetermined frequency and having an amplitude proportional to a measured variable to the input of said amplifier means, push-pull demodulator means connected to the output of said amplifier means and arranged to develop a direct current output signal proportional to the output of said amplifier means, a shaft having a recording element connected thereto, electromagnetic means for deflecting said shaft in accordance with the value of said direct current output signal, a square wave reference signal source of constant amplitude and of said predetermined frequency, stationary winding means surrounding said shaft, a rotor winding carried by said shaft and electromagnetically coupled to said stationary winding means, means for connecting said square wave reference signal to said stationary winding means so as to induce a square wave feedback signal in said rotor winding the amplitude of which is proportional to the position of said shaft, and means for applying said square wave feedback signal to the input of said amplifier means in phase opposition to said input square wave signal.

3. In a process control system, an electronic recorder comprising an amplifier, means for applying an input square wave signal having an amplitude proportional to a measured variable to the input of said amplifier means, synchronous demodulator means connected to the output of said amplifier for developing a pair of direct current output signals of opposite polarities proportional in amplitude to the square wave output of said amplifier, a shaft positioned within a magnetic field and having a recording element connected thereto, a pair of rotor windings positioned within said field and carried by said shaft, means for supplying said direct current output signals to said rotor windings so that said shaft is positioned in accordance with the amplitude of said direct current output signals, means connected to said shaft for developing a square wave feedback signal having an amplitude proportional to the position of said shaft, and means for applying said square wave feedback signal to the input of said amplifier in opposition to said square wave input signal, thereby to limit the current drawn by said rotor windings to a relatively small value during periods when said recording element is at rest.

4. In a process control system, an electronic recorder comprising an amplifier, means for applying an input square wave signal having an amplitude proportional to a measured variable to the input of said amplifier means, synchronous demodulator means connected to the output of said amplifier for developing a pair of direct current output signals of opposite polarities proportional in amplitude to the square wave output of said amplifier, a shaft positioned within a magnetic field and having a recording element connected thereto, a pair of rotor windings positioned within said field and carried by said shaft, a pair of transistors, means connecting the emitters of said transistors to a point of fixed potential through a common impedance element, whereby said transistors normally draw relatively little current, means connecting the collectors of said transistors to the end of each of said rotor windings, means connecting the other end of said rotor windings to a point of fixed potential, means for applying said direct current output signals to the base elements of said transistors so that upon an increase in the square wave output of said amplifier said transistors produce an increase in current flow through one rotor winding and a decrease in current flow through the other rotor winding and said shaft is positioned in accordance therewith, means connected to said shaft for developing a square wave feedback signal having an amplitude proportional to the position of said shaft, and means for applying said square wave feedback signal to the input of said amplifier in opposition to said square wave input signal, thereby to limit the current drawn by said rotor windings to a relatively small value during periods when said recording element is at rest.

5. In a process control system, an electronic recorder comprising an amplifier, means for applying an input square wave signal having an amplitude proportional to a measured variable to the input of said amplifier means, synchronous demodulator means connected to the output of said amplifier for developing a pair of direct current output signals of opposite polarities proportional in amplitude to the square wave output of said amplifier, a shaft positioned within a magnetic field and having a recording element connected thereto, a pair of rotor windings positioned within said field and carried by said shaft, a pair of transistors, means connecting the emitters of said transistors to a point of fixed potential through a common impedance element, whereby said transistors normally draw relatively little current, means connecting the collectors of said transistors to the end of each of said rotor windings, means connecting the other end of said rotor windings to a point of fixed potential, means for applying said direct current output signals to the base elements of said transistors so that upon an increase in the square wave output of said amplifier said transistors produce an increase in current flow through one rotor winding and a decrease in current flow through the other rotor winding and said shaft is positioned in accordance therewith, means connected to said shaft for developing a square wave feedback signal having an amplitude proportional to the position of said shaft, means for applying said square wave feedback signal to the input of said amplifier in opposition to said square wave input signal, thereby to limit the current drawn by said rotor windings to a relatively small value during periods when said recording element is at rest, and means including a unilaterally conducting element connected across each of said rotor windings for suppressing inductive transients across said rotor windings which would damage said transistors.

6. In a process control system, an electronic recorder comprising an amplifier, means for applying an input square wave signal having an amplitude proportional to a measured variable to the input of said amplifier means, synchronous demodulator means connected to the output of said amplifier for developing a pair of direct current output signals of opposite polarities proportional in amplitude to the square wave output of said amplifier, a cylindrical sleeve structure defining a magnetic field, said sleeve structure comprising a pair of semi-cylindrical sleeve elements positioned in opposed spaced apart relation by means of a pair of elongated permanent magnets of rectangular cross section, a shaft pivotally mounted within said cylindrical sleeve structure and carrying a rotor element, a pair of windings on said rotor, means for supplying said direct current output signals to said rotor windings so that said shaft is positioned in accordance with the amplitude of said direct current output signals, means connected to said shaft for developing a square wave feedback signal having an amplitude proportional to the position of said shaft, and means for applying said square wave feedback signal to the input of said amplifier in opposition to said square wave input signal, thereby to limit the current drawn by said rotor windings to a relatively small value during periods when said recording element is at rest.

7. In a process control system, an electronic recorder comprising an amplifier, means for applying an input square wave signal having an amplitude proportional to a measured variable to the input of said amplifier means, synchronous demodulator means connected to the output of said amplifier for developing a pair of direct current output signals of opposite polarities proportional in amplitude to the square wave output of said amplifier, a cylindrical sleeve structure defining a magnetic field, said sleeve structure comprising a pair of semicylindrical sleeve elements positioned in opposed spaced apart relation by means of a pair of elongated permanent magnets of rectangular cross section, a shaft pivotally mounted within said cylindrical sleeve structure and carrying a rotor element, a pair of windings on said rotor, a pair of transistors, means connecting the emitters of said transistors to a point of fixed potential through a common impedance element, whereby said transistors normally draw relatively little current, means connecting the collectors of said transistors to the end of each of said rotor windings, means connecting the other ends of said rotor windings to a point of fixed potential, means for applying said direct current output signals to the base elements of said transistors so that upon an increase in the square wave output of said amplifier said transistors produce an increase in current flow through one rotor winding and a decrease in current flow through the other rotor winding and said shaft is positioned in accordance therewith, means connected to said shaft for developing a square wave feedback signal having an amplitude proportional to the position of said shaft, and means for applying said square wave feedback signal to the input of said amplifier in opposition to said square wave input signal, thereby to limit the current drawn by said rotor windings to a relatively small value during periods when said recording element is at rest.

8. In a process control system, an electronic recorder comprising an amplifier, means for applying an input square wave signal having an amplitude proportional to a measured variable to the input of said amplifier means, synchronous demodulator means connected to the output of said amplifier means and arranged to develop a direct current output signal proportional to the output of said amplifier means, a shaft having a recording element connected thereto, electromagnetic means for deflecting said shaft in accordance with the value of said direct current output signal, a square wave reference signal source of constant amplitude, stationary winding means surrounding said shaft, a rotor winding carried by said shaft and electromagnetically coupled to said stationary winding means, means for connecting said square wave reference signal to said stationary winding means so as to induce a square wave feedback signal in said rotor winding the amplitude of which is proportional to the position of said shaft, a voltage divider network connected to said square wave reference signal source, and means connecting said voltage divider network and said rotor winding in series to the input of said amplifier means and in phase opposition to said input square wave signal.

9. In a process control system, an electronic recorder comprising an amplifier, means for applying an input square wave signal having an amplitude proportional to a measured variable to the input of said amplifier means, synchronous demodulator means connected to the output of said amplifier means and arranged to develop a direct current output signal proportional to the output of said amplifier means, a shaft having a recording element connected thereto, electromagnetic means for deflecting said shaft in accordance with the value of said direct current output signal, a square wave reference signal source of constant amplitude, stationary winding means surrounding said shaft, a rotor winding carried by said shaft and electromagnetically coupled to said stationary winding means, means for connecting said square wave reference signal to said stationary winding means so as to induce a square wave feedback signal in said rotor winding the amplitude of which is proportional to the position of said shaft, means connected to said square wave source for developing a zero point square wave of constant amplitude, and means for adding said zero point square wave to said square wave feedback signal and applying the sum thereof to the input of said amplifier means and in phase opposition to said input square wave signal.

10. In a process control system, an electronic recorder comprising an amplifier, means for applying an input square wave signal having an amplitude proportional to a measured variable to the input of said amplifier means, synchronous demodulator means connected to the output of said amplifier means and arranged to develop a direct current output signal proportional to the output of said amplifier means, a shaft having a recording element connected thereto, electromagnetic means for deflecting said shaft in accordance with the value of said direct current output signal, a square wave reference signal source of constant amplitude, stationary winding means surrounding said shaft, a rotor winding carried by said shaft and electromagnetically coupled to said stationary winding means, means for connecting said square wave reference signal to said stationary winding means so as to induce a square wave feedback signal in said rotor winding the amplitude of which is proportional to the position of said shaft, means connected to said square wave source for developing a zero point square wave of constant amplitude, means for adding said zero point square wave to said square wave feedback signal and applying the sum thereof to the input of said amplifier means and in phase opposition to said input square wave signal, and means for adjusting the amplitude of said zero point square wave, thereby to adjust the zero setting of said recording element.

11. In a process control system, an electronic recorder comprising an amplifier, means for applying an input square wave signal having an amplitude proportional to a measured variable to the input of said amplifier means, synchronous demodulator means connected to the output of said amplifier means and arranged to develop a direct current output signal proportional to the output of said amplifier means, a shaft having a recording element connected thereto, electromagnetic means for deflecting said shaft in accordance with the value of said direct current output signal, a square wave reference signal source of constant amplitude, stationary winding means surrounding said shaft, a rotor winding carried by said shaft and electromagnetically coupled to said stationary winding means, means for connecting said square wave reference signal to said stationary winding means so as to induce a square wave feedback signal in said rotor winding the amplitude of which is proportional to the position of said shaft, means connected to said square wave source for developing a zero point square wave of constant amplitude, means for adding said zero point square wave to said square wave feedback signal and applying the sum thereof to the input of said amplifier means and in phase opposition to said input square wave signal, and means included in said last named means for adjusting said sum, whereby the span of said recording element may be adjusted to correspond to the range of said square wave input signal.

12. In a process control system, an electronic recorder comprising an amplifier means having an input and an output circuit, means for applying an input square wave signal having a magnitude proportional to a measured variable to the input circuit of said amplifier means to develop an amplified square signal at the output circuit of the amplifier means, demodulator means connected to the output circuit of said amplifier means and arranged to develop a direct current output signal proportional to the amplified square wave signal, means for generating a magnetic field, a shaft positioned within the magnetic field and having a recording element connected thereto, electromagnetic means for deflecting said shaft in accordance with the value of the direct current output signal, means coupled to said shaft including a stationary winding to which a reference signal of substantially constant amplitude is applied and a winding carried by the shaft for developing a square wave feedback signal having a magnitude proportional to the position of said shaft, and means for applying said square wave feedback signal to the input circuit of said amplifier means in opposition to said square wave input signal.

References Cited by the Examiner

UNITED STATES PATENTS

| 2,323,267 | 6/43 | Wittkuhns et al. | 73—88.5 |
| 2,630,008 | 3/53 | Howe et al. | 73—88.5 |
| 2,787,512 | 4/57 | Pierstorff | 346—32 |
| 2,812,229 | 11/57 | Strimel | 346—32 |
| 2,845,597 | 7/58 | Perkins. | |
| 2,856,468 | 10/58 | Berry | 324—100 X |
| 2,889,518 | 6/59 | Hudson et al. | 324—99 X |
| 3,006,188 | 10/61 | Handel et al. | 73—194 |

OTHER REFERENCES

Article entitled "A Square Wave Electromagnetic Flowmeter for application to Intact Blood Vessels"; from Circulation Research, vol. III, January 1955, pp. 39–46; by A. B. Denison, Jr., M.D., et al.

LEO SMILOW, *Primary Examiner.*

ROBERT L. EVANS, RICHARD C. QUEISSER,
*Examiners.*